United States Patent
Inoue et al.

(10) Patent No.: US 6,972,044 B2
(45) Date of Patent: Dec. 6, 2005

(54) BATTERY ELECTRODE AND MANUFACTURING METHOD AND APPARATUS FOR THE SAME

(75) Inventors: Hiroshi Inoue, Toyohashi (JP); Kiwamu Inui, Okazaki (JP); Mitsugu Takaki, Toyohashi (JP); Shinichi Hojioka, Fujisawa (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 10/947,753

(22) Filed: Sep. 22, 2004

(65) Prior Publication Data

US 2005/0037261 A1 Feb. 17, 2005

Related U.S. Application Data

(62) Division of application No. 09/829,315, filed on Apr. 9, 2001, now Pat. No. 6,815,120.

(30) Foreign Application Priority Data

Apr. 10, 2000 (JP) .............................. 2000-108496

(51) Int. Cl.[7] .................. H01M 6/00; H01M 4/60; H01M 4/80; H01M 4/66; B23P 12/00
(52) U.S. Cl. ................. 29/623.1; 429/213; 429/235; 429/236; 429/245; 29/2
(58) Field of Search ................. 429/211, 213, 188, 429/181, 210, 59, 223, 235, 162, 164, 218.2, 429/326, 233, 49, 94; 15/240; 141/33; 257/678; 428/292.2, 67; 216/2, 56; 29/623.1, 623.5; 156/73.1

(56) References Cited

U.S. PATENT DOCUMENTS

| | | | |
|---|---|---|---|
| 1,560,400 A * | 11/1925 | Vander Putten | 15/420 |
| 4,591,087 A | 5/1986 | Frasch | |
| 4,865,932 A | 9/1989 | Masuda et al. | |
| 4,975,133 A | 12/1990 | Gochermann | |
| 5,657,522 A * | 8/1997 | Figueira et al. | 29/2 |
| 5,682,928 A * | 11/1997 | Keith | 141/33 |
| 5,883,460 A | 3/1999 | Sato et al. | |
| 6,284,408 B1 * | 9/2001 | Akazawa et al. | 429/211 |
| 6,298,530 B1 * | 10/2001 | Barber et al. | 29/2 |
| 6,815,120 B2 * | 11/2004 | Inoue et al. | 429/211 |

FOREIGN PATENT DOCUMENTS

FR 2 213 150 10/1974

(Continued)

Primary Examiner—Michael Barr
Assistant Examiner—Robert Hodge
(74) Attorney, Agent, or Firm—Hamre, Schumann, Mueller & Larson, P.C.

(57) ABSTRACT

A workpiece, in which a lead is laid on top of a three-dimensional porous metal body, is placed between an ultrasonic horn and an anvil with a lead portion facing the ultrasonic horn. A support is raised so that the lead portion of the workpiece is pressed between the ultrasonic horn and the anvil. While being rotated around a central shaft with a motor, the ultrasonic horn vibrates at a frequency of 20 kHz in the shaft direction. Thus, the workpiece is advanced continuously, so that the lead is bonded ultrasonically to the three-dimensional porous metal body (i.e., metal-to-metal bonding is established). It is possible to provide a battery electrode that can be produced continuously at a lower running cost, reduce the faulty welding with a current collecting plate, and prevent short-circuits.

6 Claims, 5 Drawing Sheets

FOREIGN PATENT DOCUMENTS

| | | | | |
|---|---|---|---|---|
| GB | 2 200 068 | | 7/1988 | |
| JP | 63-40252 | | 2/1988 | |
| JP | 63-040254 | | 2/1988 | |
| JP | 02250261 | * | 3/1989 | ........... H01M 4/26 |
| JP | 03201367 | * | 12/1989 | ........... H01M 4/26 |
| JP | 2-250261 | | 10/1990 | |
| JP | 3-201367 | | 8/1991 | |
| JP | 4-123757 | | 4/1992 | |
| JP | 09017411 | * | 1/1997 | ........... H01M 2/26 |
| JP | 09-253869 | | 9/1997 | |
| JP | 09-314359 | | 12/1997 | |
| JP | 10-15491 | | 1/1998 | |
| JP | 11-120985 | | 4/1999 | |
| WO | 99/38221 | | 7/1999 | |
| WO | 00/15381 | | 3/2000 | |

* cited by examiner

US 6,972,044 B2

BATTERY ELECTRODE AND MANUFACTURING METHOD AND APPARATUS FOR THE SAME

This application is a divisional of application Ser. No. 09/829,315, filed Apr. 9, 2001, now U.S. Pat. No. 6,815,120, which application is incorporated herein by reference.

BACKGROUND OF THE INVENTION

1. Field of the Invention

The present invention relates to a battery electrode produced by bonding a lead to a three-dimensional porous metal body and a manufacturing method and apparatus for the same.

2. Description of the Related Art

A battery electrode usually includes a lead to be connected to a positive electrode terminal or a current collecting plate. This type of battery electrode has been manufactured by a resistance seam welding process. Specifically, as shown in FIG. 6, first, a rod-shaped Cu electrode 22 for welding is brought into contact with a lead 21, which has been laid on top of a three-dimensional porous metal body 20. Then, the lead 21 is pressed into close contact with the three-dimensional porous metal body 20, and a large amount of current flows between the three-dimensional porous metal body 20, acting as a positive electrode, and the Cu electrode 22, acting as a negative electrode. Thus, the lead 21 is spot-welded to the three-dimensional porous metal body 20. Then, the three-dimensional porous metal body 20, to which the lead 21 has been welded, is filled with an active material and rolled. Finally, the three-dimensional porous metal body 20 thus filled with an active material and rolled is cut to a predetermined size, resulting in a battery electrode.

However, the method for manufacturing a battery electrode by the resistance seam welding process makes continuous production difficult and increases the running cost. This is because the lifetime of the Cu electrode 22 for welding is short, which requires maintenance at frequent intervals. Moreover, when the Cu electrode 22 is used as a welding electrode, though the welding performance is improved, sputtering occurs to increase short-circuits because of the inclusion of Cu. In addition, the active material that enters the gap between the lead 21 and the three-dimensional porous metal body 20 during the filling process remains, so that faulty welding often is caused when the battery electrode and a current collecting plate are welded together, and short-circuits are increased as well.

SUMMARY OF THE INVENTION

Therefore, with the foregoing in mind, it is an object of the present invention to provide a battery electrode that can be produced continuously at a lower running cost, reduce the faulty welding with a current collecting plate, and prevent short-circuits, and a manufacturing method and apparatus for the same.

To achieve the above object, a configuration of a battery electrode of the present invention includes an electrode plate and a lead bonded to the electrode plate. The entire surface of the lead opposed to the electrode plate is bonded ultrasonically to the electrode plate. This configuration can provide a battery electrode to which the entire surface of the lead opposed to the electrode plate is bonded, so that no active material enters the bonding area between the lead and the electrode plate. When the electrode is cut to a predetermined size, the lead also is cut. Therefore, if any active material has entered the bonding area, the material comes out during cutting. This is likely to cause the faulty welding between the electrode and a current collecting plate. However, the configuration of a battery electrode of the present invention is such that no active material enters the bonding area between the lead and the electrode plate, so that the faulty welding can be reduced.

In the configuration of a battery electrode of the present invention, it is preferable that the electrode plate is a three-dimensional porous metal body, and that the lead is bonded to one edge portion of the three-dimensional porous metal body.

In the configuration of a battery electrode of the present invention, it is preferable that the entire surface of the electrode plate is patterned by applying pressure, to which the lead is bonded. Those patterns can be used to judge whether the bonding strength is optimized or whether the uniformity of bonding is maintained over the lead surface.

A method for manufacturing a battery electrode of the present invention includes bonding a lead to an electrode plate. In this method for manufacturing a battery electrode, a three-dimensional porous metal body is used as the electrode plate, and the lead is continuously bonded ultrasonically to the three-dimensional porous metal body, which then is filled with an active material and rolled. According to this method for manufacturing a battery electrode, the entire surface of the lead opposed to the three-dimensional porous metal body can be bonded continuously thereto. As a result, no active material enters the bonding area between the three-dimensional porous metal body and the lead during the filling and rolling processes. Thus, the faulty welding between the electrode and a current collecting plate can be reduced.

In the method for manufacturing a battery electrode of the present invention, it is preferable that any excess active material is removed after the filling and rolling processes. According to this preferred example, the excess active material that adheres to the lead portion and the surface of the three-dimensional porous metal body can be removed. Therefore, the faulty welding between the final battery electrode and a current collecting plate can be reduced, and short-circuits can be prevented as well. In this case, the excess active material is removed preferably by spraying air. According to this preferred example, the excess active material can be removed easily. Also, the same effect can be obtained by brushing. In this case, it is further preferable that the removed excess active material is collected by suction.

An apparatus for manufacturing a battery electrode of the present invention includes an ultrasonic horn and an anvil. The ultrasonic horn is in the form of a disk, and can rotate around a central axis and vibrate in the central axis direction. The anvil is in the form of a disk, arranged opposing the ultrasonic horn on the same plane, and can rotate around a central axis. The ultrasonic horn and the anvil move relative to each other so that the circumferential surfaces of the ultrasonic horn and the anvil can be pressed together to make contact continuously. The apparatus for manufacturing a battery electrode having the above configuration is provided with the disk-shaped ultrasonic horn and anvil. Therefore, a hoop material can be used as a workpiece, i.e., the material to be welded is supplied continuously from a roll. As a result, battery electrodes can be produced continuously by supplying the hoop material, thereby reducing the running cost.

In the configuration of the apparatus for manufacturing a battery electrode of the present invention, it is preferable that the anvil has concavities and convexities formed on the circumferential surface thereof. According to this preferred example, the function of holding a workpiece can be enhanced. In this case, it is preferable that the surface area of the convexities is 10% to 50% of the overall occupied area of the circumferential surface of the anvil. Also, in this case, it is preferable that the circumferential surface of the anvil is coated with ceramic or plated with nickel. Moreover, in this case, a depth of the concavities preferably is in the range of 20 µm to 100 µm.

In the configuration of the apparatus for manufacturing a battery electrode of the present invention, it is preferable that the ultrasonic horn has a flat circumferential surface. This preferred example can improve the maintenance of the ultrasonic horn and increase the lifetime thereof, so that the efficiency of the continuous production of battery electrodes is improved.

In the configuration of the apparatus for manufacturing a battery electrode of the present invention, it is preferable that a width of the circumferential surface of the ultrasonic horn is the same as that of the anvil, and that both edges of the circumferential surfaces of the ultrasonic horn and the anvil are cut off. According to this preferred example, since the abrasion of the ultrasonic horn and the anvil proceeds simultaneously, the lifetime of the apparatus can be made still longer. Moreover, this preferred example can prevent the vicinity of the lead portion from being cut when the lead portion of the workpiece is pressed between the ultrasonic horn and the anvil.

As described above, the present invention can provide a battery electrode that can be produced continuously at a lower running cost, reduce the faulty welding with a current collecting plate, and prevent short-circuits.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described more specifically by the use of an embodiment.

Figure 1:
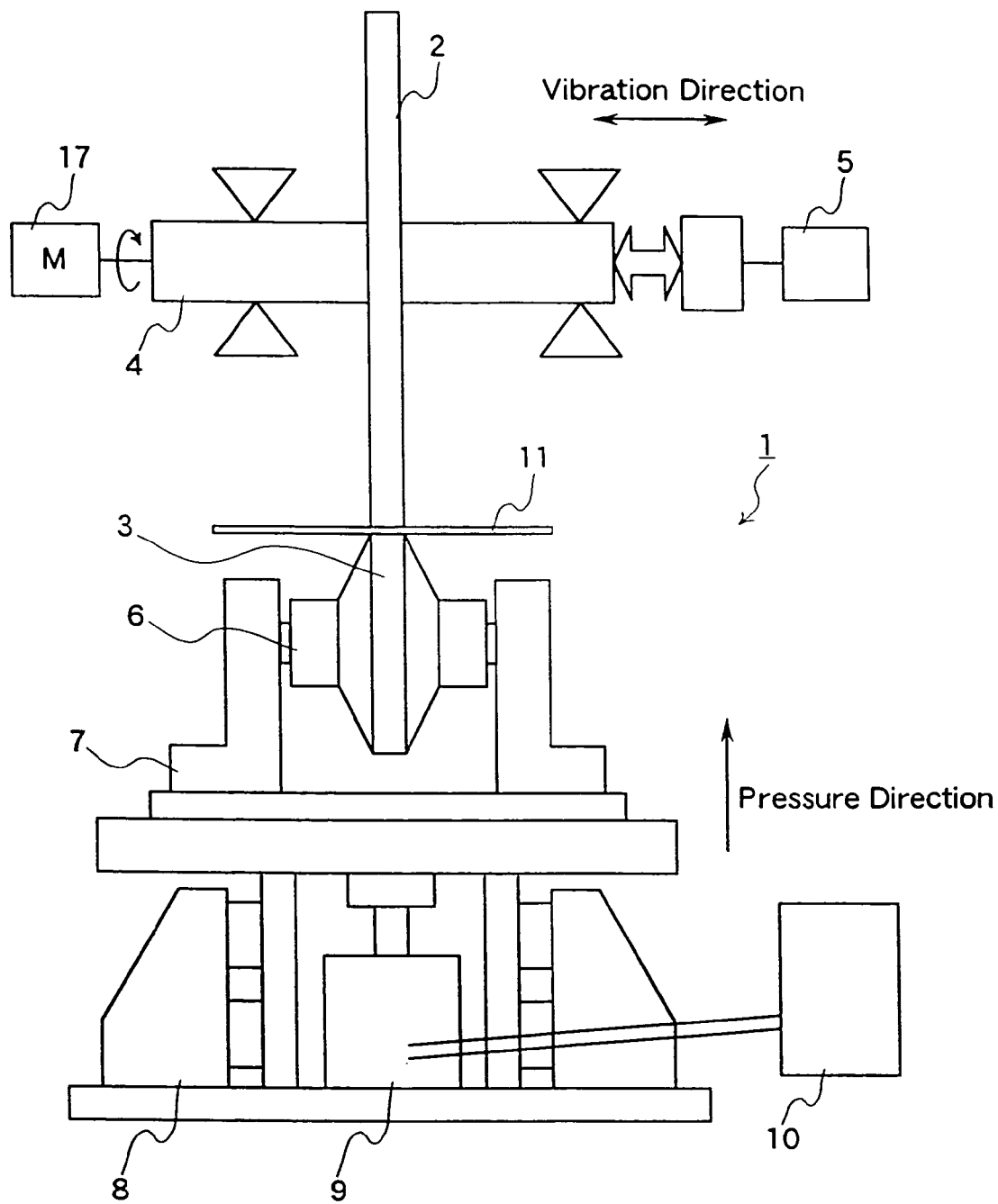
FIG. 1 shows a configuration of an ultrasonic bonding apparatus (ultrasonic welder) to be used in an embodiment of the present invention.
Figure 2:
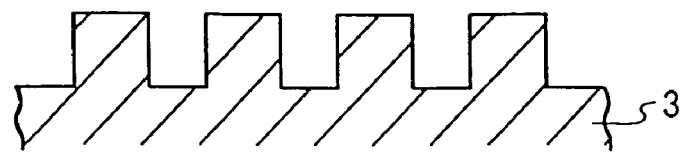
FIG. 2 is a cross-sectional view showing the shape of the circumferential surface of an anvil in the ultrasonic boding apparatus of FIG. 1.
Figure 3:
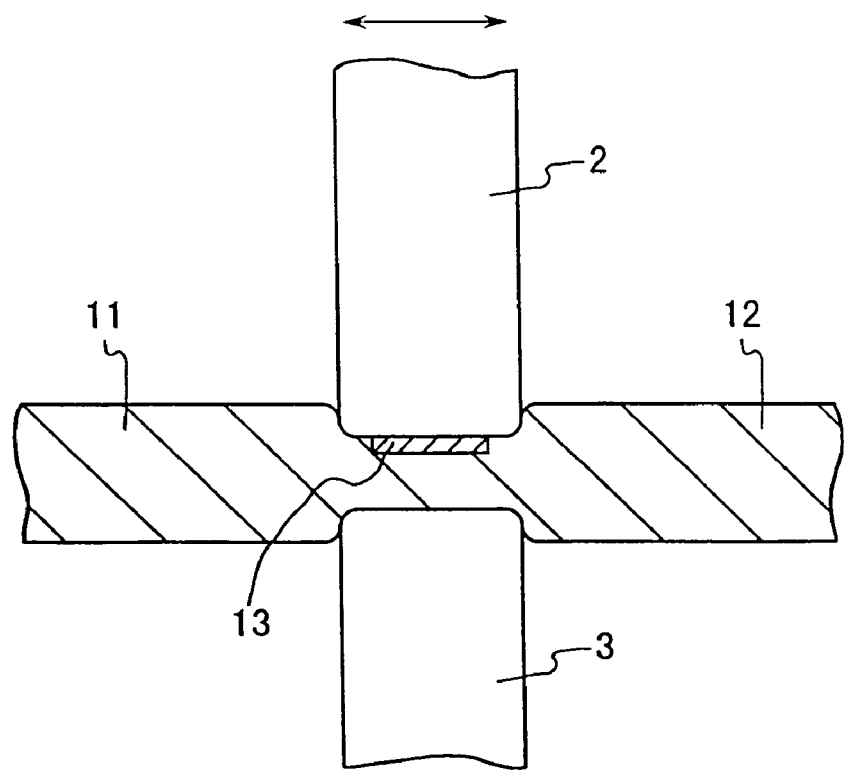
FIG. 3 is a schematic view showing a three-dimensional porous metal body and a lead, which are bonded together using the ultrasonic bonding apparatus of FIG. 1.
Figure 4:
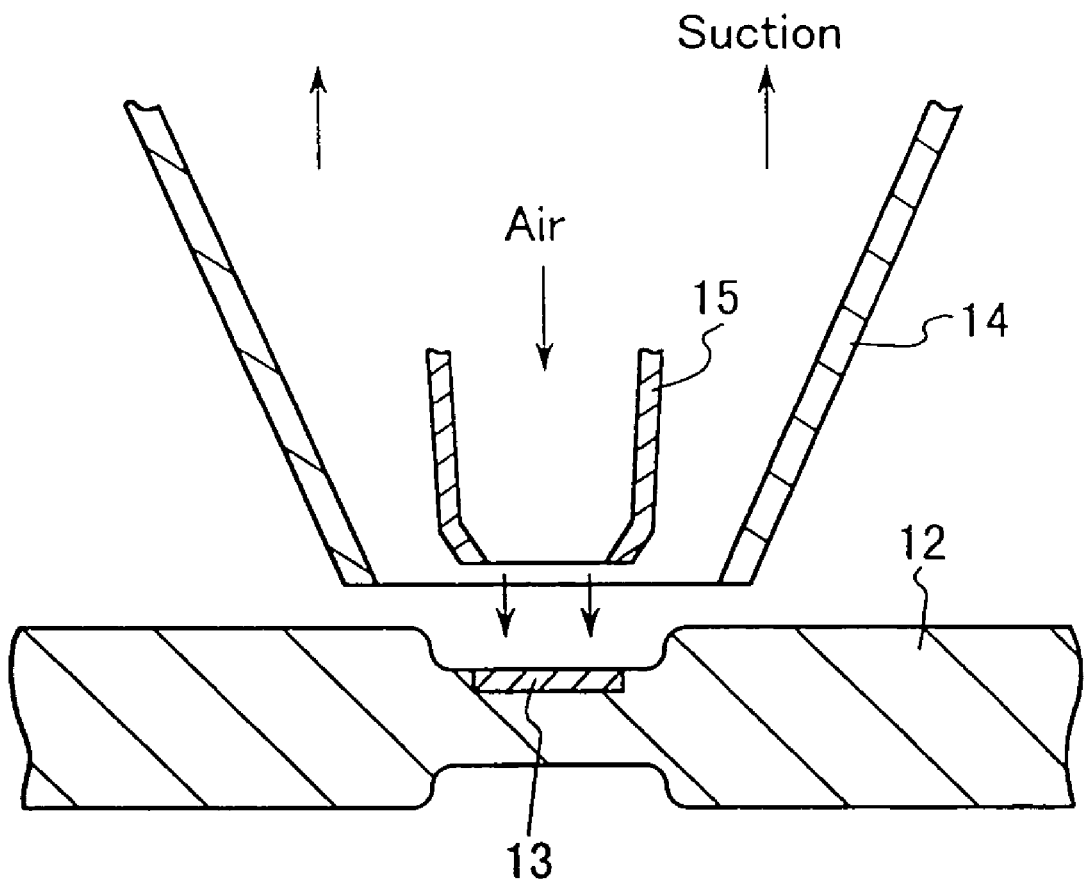
FIG. 4 is a schematic view showing a process of removing excess active material.
Figure 5:
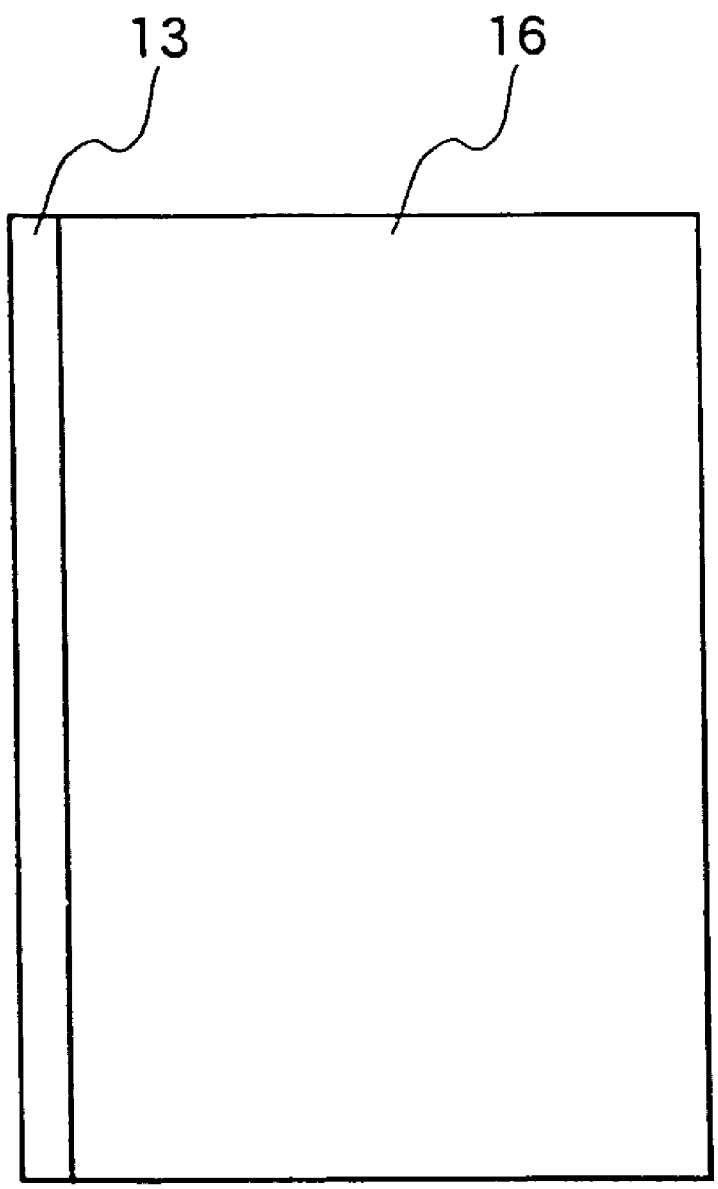
FIG. 5 is a plan view showing a battery electrode produced by a manufacturing method of an embodiment of the present invention.
Figure 6:
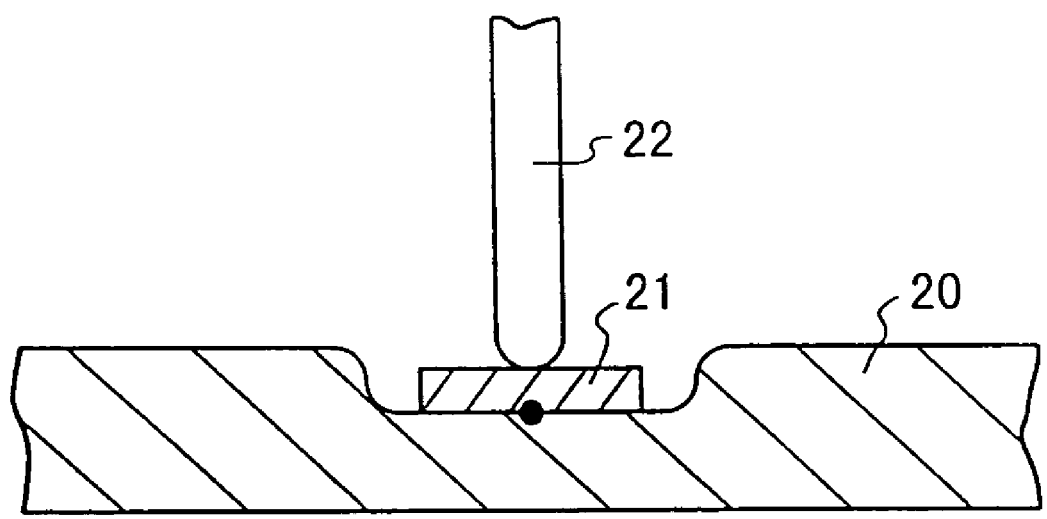
FIG. 6 is a schematic view showing a process of manufacturing a battery electrode plate according to the prior art.

In this embodiment, a three-dimensional porous metal body that acts as an electrode plate and a lead are bonded ultrasonically by utilizing ultrasonic vibration (i.e., metal-to-metal bonding is established). FIG. 1 shows a configuration of an ultrasonic bonding apparatus (ultrasonic welder) to be used in this embodiment. FIG. 2 is a cross-sectional view showing the shape of the circumferential surface of an anvil in the ultrasonic bonding apparatus. FIG. 3 is a schematic view showing a three-dimensional porous metal body and a lead, which are bonded together using the ultrasonic bonding apparatus. FIG. 4 is a schematic view showing a process of removing an excess active material. FIG. 5 is a plan view showing a battery electrode produced by a manufacturing method of this embodiment.

As shown in FIG. 1, an ultrasonic bonding apparatus 1 includes an ultrasonic horn 2 and an anvil 3 as basic components; the anvil 3 is placed under the ultrasonic horn 2.

The ultrasonic horn 2 is in the form of a disk having a diameter of 240 mm and a thickness (width) of 8 mm, rotated around a central shaft 4 with a motor 17, and supported movably in the shaft direction. A vibrator 5, which can generate ultrasonic vibration of longitudinal waves with a frequency of 20 kHz, is connected to the central shaft 4. This allows the ultrasonic horn 2 to vibrate at amplitude of 12 µm in the shaft direction. The amplitude of the ultrasonic horn 2 can vary from 11.1 µm to 30 µm.

The anvil 3 is in the form of a disk having a diameter of 60 mm and a circumferential surface width of 8 mm, and supported rotatably by a support 7 via a central shaft 6. Here, the anvil 3 and the ultrasonic horn 2 are arranged on the same plane opposing each other. Also, the anvil 3 can rotate around the central shaft 6. The support 7 is supported by a base 8 so as to move up and down and is connected to an air cylinder 9 at the lower face thereof. Moreover, a pressure gage 10 for measuring air pressure is connected to the air cylinder 9. A workpiece 11, in which a lead is laid on top of a three-dimensional porous metal body (Ni), is placed between the ultrasonic horn 2 and the anvil 3 with a lead portion facing the ultrasonic horn 2. Then, the support 7 is raised so that the lead portion of the workpiece 11 is pressed between the ultrasonic horn 2 and the anvil 3. At this time, the applied pressure is 940 N (the air pressure is 0.20 MPa and the total mass of the anvil, the central shaft, and the support is 12 kg). The speed of supplying the workpiece 11 is 10 m/min.

As described above, since this embodiment provides the disk-shaped ultrasonic horn 2 and anvil 3, a hoop material can be used as the workpiece 11. As a result, battery electrodes can be produced continuously by supplying the hoop material, thereby reducing the running cost.

As shown in FIG. 2, the anvil 3 has geometrically arranged concavities and convexities on the circumferential surface to enhance the function of holding the workpiece 11. Such unevenness is formed by etching, an electrodeposition process, or machining. Here, it is desirable that the surface area of the convexities is 10% to 50% of the overall occupied area of the circumferential surface of the anvil 3. When the surface area is below 10% or above 50% of the overall occupied area of the circumferential surface of the anvil 3, the function of holding the workpiece 11 is lowered, which is undesirable. In this embodiment, the surface area of the convexities is set to 20% of the overall occupied area of the circumferential surface of the anvil 3. Moreover, it is desirable that the depth of the concavities is in the range of 20 µm to 100 µm. The depth less than 20 µm is undesirable because the function of holding the workpiece 11 is lowered. Also, the depth more than 100 µm is undesirable because it becomes difficult to collect the active material entering the concavities formed in a three-dimensional porous metal body after the convexities of the anvil 3 have been transferred. Even if the anvil 3 has the concavities with a depth more than 100 µm, it will not so much affect the function of holding the workpiece 11. In this embodiment, the depth of the concavities is set to 80 μm. Furthermore, the uneven circumferential surface of the anvil 3 is coated with ceramic or plated with nickel to prevent the adhesion of a three-dimensional porous metal body (Ni).

The ultrasonic horn 2 has a flat circumferential surface to improve the maintenance. This can increase the lifetime of the ultrasonic horn 2 and the efficiency of the continuous production of battery electrode plates. In this embodiment, particularly, the width of the ultrasonic horn 2 is the same as that of the anvil 3, and thus the abrasion of the ultrasonic horn 2 and the anvil 3 proceeds simultaneously. Therefore, the lifetime of the apparatus can be made still longer. Moreover, increasing the pressure applied by the anvil 3 ensures that the lead portion is held.

Furthermore, both edges of the circumferential surfaces of the ultrasonic horn 2 and the anvil 3 are cut off to have a round surface (R surface) or a small chamfered surface (C surface), as shown in FIG. 3. This can prevent the vicinity of the lead portion from being cut when the lead portion of the workpiece 11 is pressed between the ultrasonic horn 2 and the anvil 3.

Next, a method for manufacturing a battery electrode using the ultrasonic bonding apparatus having the above configuration will be described.

First, a three-dimensional porous metal body 12 made of Ni and having a width of 150 mm is prepared.

Then, a lead 13 having a width of 6 mm is passed through a guide (not shown) and laid on top of a predetermined area of the three-dimensional porous metal body 12, resulting in a workpiece 11.

The workpiece 11 is placed between the ultrasonic horn 2 and the anvil 3 with a lead portion facing the ultrasonic horn 2. Then, the support 7 is raised so that the lead portion of the workpiece 11 is pressed between the ultrasonic horn 2 and the anvil 3.

Next, while being rotated around the central shaft 4 with the motor 17, the ultrasonic horn 2 vibrates in the shaft direction. This allows the workpiece 11 to be advanced continuously, so that the entire surface of the lead 13 opposed to the three-dimensional porous metal body 12 is bonded ultrasonically to the predetermined area of the three-dimensional porous metal body 12 (i.e., metal-to-metal bonding is established), as shown in FIG. 3. In this embodiment, since the ultrasonic bonding apparatus 1 is used for bonding the lead 13 to the three-dimensional porous metal body 12, the entire surface of the lead 13 opposed to the three-dimensional porous metal body 12 is bonded thereto. As a result, no active material enters the bonding area between the three-dimensional porous metal body 12 and the lead 13 in the subsequent processes, including filling the workpiece with an active material and rolling it. Thus, the faulty welding between the final electrode and a current collecting plate can be reduced. In addition, a welding electrode is not used, which can prevent sputtering and short-circuits caused by the inclusion of Cu or the like. In this case, it is desirable that the entire surface of the three-dimensional porous metal body 12 is patterned, e.g., with projections or the like by applying pressure, to which the lead 13 is bonded. Those patterns can be used to judge whether the bonding strength is optimized or whether the uniformity of bonding is maintained over the lead 13 surface.

Then, the three-dimensional porous metal body 12, to which the lead 13 has been bonded, is filled with an active material and rolled.

After the filling and rolling processes, air is sprayed on the three-dimensional porous metal body 12 around the lead 13 portion, as shown in FIG. 4. In such a manner, the excess active material that adheres to the lead 13 portion and the surface of the three-dimensional porous metal body 12 is removed. As a result, the faulty welding between the final battery electrode and a current collecting plate can be reduced, and short-circuits can be prevented as well. In this case, the use of an apparatus provided with a suction nozzle 14 having a diameter larger than the width of the lead 13 and an injection nozzle 15 housed in the suction nozzle 14 allows the excess active material to be removed and collected at the same time. Thus, efficient operations can be achieved.

Finally, the workpiece 11, from which the excess active material has been removed and collected, is cut to a width of 35 mm and a length of 80 mm. This results in a battery electrode 16 having the lead 13 on one edge portion thereof, as shown in FIG. 5.

In a method for manufacturing a battery electrode of the present invention, the entire surface of a lead opposed to an electrode plate is bonded to the electrode plate. Thus, a burr that occurs when the lead peels off during cutting can be suppressed. Moreover, since the lead is provided on one edge portion of the electrode plate, a battery electrode having an excellent efficiency of collecting current can be manufactured easily.

In this embodiment, air is sprayed to remove any excess active material. However, the present invention is not limited thereto. For example, a brush may be used instead of the injection nozzle 15 in FIG. 4.

In this embodiment, the workpiece 11 is placed between the ultrasonic horn 2 and the anvil 3 with the lead portion facing the ultrasonic horn 2. However, the present invention is not limited thereto, and the workpiece 11 may be placed between the ultrasonic horn 2 and the anvil 3 with the lead portion facing the anvil 3.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method for manufacturing a battery electrode comprising:
    pressing a workpiece, in which a lead is laid on a predetermined area of a three-dimensional porous metal body, between an ultrasonic horn and anvil,
    wherein a circumferential surface of the anvil includes a surface area made uneven so that a surface area of convexities is 10% to 50% of an overall occupied area of the circumferential surface,
    ultrasonically bonding an entire surface of the lead continuously to the three-dimensional porous metal body by vibrating the ultrasonic horn in a shaft direction while rotating the ultrasonic horn around the shaft; and subsequently
    filling an active material into the three-dimensional porous metal body and rolling the three-dimensional porous metal body.

2. The method according to claim 1, wherein excess active material is removed after the filling and rolling processes.

3. The method according to claim 2, wherein the excess active material is removed by spraying air.

4. The method according to claim 2, wherein the excess active material is removed by brushing.

5. The method according to claim 3, wherein the removed excess active material is collected by suction.

6. The method according to claim 4, wherein the removed excess active material is collected by suction.

* * * * *